United States Patent
Kumakiri et al.

(10) Patent No.: US 7,960,050 B2
(45) Date of Patent: Jun. 14, 2011

(54) SECONDARY CELL AND ITS MANUFACTURING METHOD

(75) Inventors: Hideyuki Kumakiri, Osaka (JP); Seiichi Katou, Osaka (JP)

(73) Assignee: Panasonic Corporation, Osaka (JP)

( * ) Notice: Subject to any disclaimer, the term of this patent is extended or adjusted under 35 U.S.C. 154(b) by 125 days.

(21) Appl. No.: 12/442,791

(22) PCT Filed: Oct. 30, 2007

(86) PCT No.: PCT/JP2007/071103
§ 371 (c)(1),
(2), (4) Date: Mar. 25, 2009

(87) PCT Pub. No.: WO2008/053880
PCT Pub. Date: May 8, 2008

(65) Prior Publication Data
US 2010/0279158 A1 Nov. 4, 2010

(30) Foreign Application Priority Data
Oct. 30, 2006 (JP) ................................. 2006-293661

(51) Int. Cl.
*H01M 4/00* (2006.01)
*H01M 2/16* (2006.01)
*H01M 2/18* (2006.01)

(52) U.S. Cl. .......... 429/94; 429/137; 429/140; 429/141; 429/147

(58) Field of Classification Search ............... 429/94, 429/131–147
See application file for complete search history.

(56) References Cited

U.S. PATENT DOCUMENTS

| | | |
|---|---|---|
| 2005/0053833 A1 | 3/2005 | Hayashida et al. |
| 2006/0051669 A1 | 3/2006 | Hayashida et al. |
| 2009/0325045 A1* | 12/2009 | Miyahisa et al. ............... 429/94 |

FOREIGN PATENT DOCUMENTS

| | | |
|---|---|---|
| JP | 08-153515 | 6/1996 |
| JP | 11-154508 | 6/1999 |
| JP | 2001-023612 | 1/2001 |
| JP | 2002-015764 | 1/2002 |
| JP | 2003-197265 | 7/2003 |
| JP | 2004-006275 | 1/2004 |

(Continued)

OTHER PUBLICATIONS

Japanese Office Action, with English translation, issued in Japanese Patent Application No. JP 2008-542132, mailed Jan. 20, 2009.

(Continued)

*Primary Examiner* — Dah-Wei D Yuan
*Assistant Examiner* — Thomas Wallen
(74) *Attorney, Agent, or Firm* — McDermott Will & Emery LLP (57) ABSTRACT

A secondary battery includes an electrode group 5 formed by winding a positive electrode plate 1 and a negative electrode plate 2 with a separator 3 interposed therebetween. Each of the positive and negative electrode plates 1 and 2 includes a current collector 1 and mixture layers 8 and 9 each containing an active material and formed on the surface of the current collector 1. A plurality of trenches 30 are formed in the surfaces of the mixture layers 8 and 9 of at least one of the positive electrode plate 1 and the negative electrode plate 2. The trenches 30 have curvature portions at side edges 30b and bottom centers 30a thereof.

12 Claims, 6 Drawing Sheets

FOREIGN PATENT DOCUMENTS

| | | |
|---|---|---|
| JP | 2004-158441 | 6/2004 |
| JP | 2005-285607 | 10/2005 |
| JP | 285607 A * | 10/2005 |
| JP | 2006-107853 | 4/2006 |
| WO | WO 98/48466 | 10/1998 |

OTHER PUBLICATIONS

Chinese Office Action, issued in Chinese Patent Application No. 200780035787.3, dated Sep. 21, 2010.

* cited by examiner

SECONDARY CELL AND ITS MANUFACTURING METHOD

RELATED APPLICATIONS

This application is the U.S. National Phase under 35 U.S.C. §371 of International Application No. PCT/JP2007/071103, filed on Oct. 30, 2007, which in turn claims the benefit of Japanese Application No. 2006-293661, filed on Oct. 30, 2006, the disclosures of which Applications are incorporated by reference herein.

TECHNICAL FIELD

The present invention relates to secondary batteries (cells) in each of which a positive electrode plate and a negative electrode plate are wound or stacked with a separator interposed therebetween, and particularly relates to a high capacity secondary battery exhibiting excellent impregnating ability for an electrolyte and a method for manufacturing such a battery.

BACKGROUND ART

Lithium ion secondary batteries, which are now widely used as power supplies for mobile electronic equipment, have achieved high potential and high capacity by employing, as active materials for negative electrodes, carbon materials capable of inserting and extracting lithium and by employing, as active materials for positive electrodes, composite oxides of transition metal and lithium, e.g. $LiCoO_2$. However, further increase in capacity is required with an increased range of functions of recent electronic equipment and communication equipment.

For example, to increase the capacity of a secondary battery, an electrode group in which a positive electrode plate and a negative electrode plate are wound with a separator interposed therebetween is pressed so that the space occupied by the positive and negative electrode plates in a battery case increases.

However, when the electrode group is pressed to hardly leave a gap between the electrode plates and the separator, it disadvantageously takes a long time to impregnate the entire electrode group with an electrolyte after pouring the electrolyte into the battery case. This problem is conspicuous especially for nonaqueous electrolytes used for lithium ion secondary batteries because of high viscosity of the nonaqueous electrolytes.

In view of this, Patent Documents 1 and 2 disclose methods for enhancing impregnating ability for electrolytes by forming trenches in the surfaces of mixture layers of electrode plates.

Figure 7:
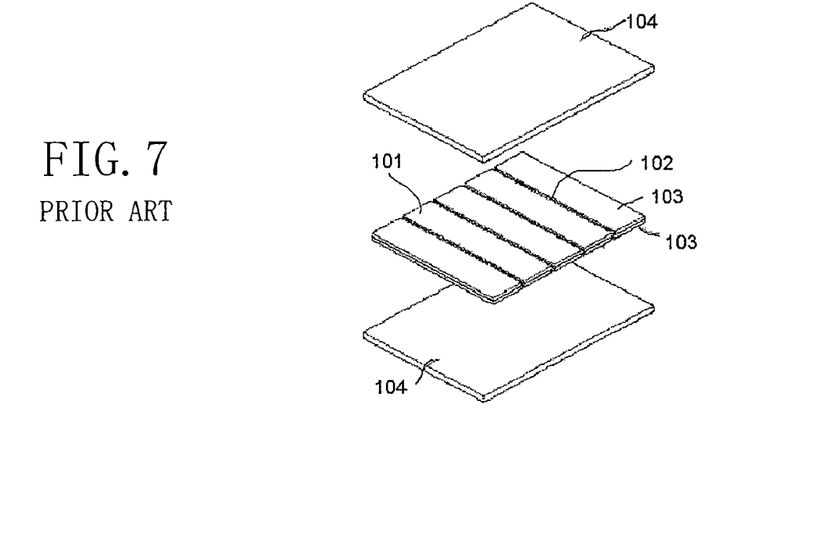
FIG. 7 is a view illustrating a structure of an electrode plate according to a conventional example.

FIG. 7 is a view illustrating a structure of an electrode plate disclosed in Patent Document 1. In FIG. 7, a plurality of trenches 102 are formed in the surface of a mixture layer 103 of an electrode plate 101. The electrode plate 101 is sandwiched between separators 104, thereby forming an electrode group. An electrolyte poured into a battery case permeates the entire electrode group by way of these trenches 102, thus reducing the time for impregnation. When the width and depth of the trenches 102 are increased, the impregnation time is reduced. However, the amount of the mixture layer decreases in this case, so that charge/discharge capacity decreases. In view of this, the width and depth of the trenches 102 are set at given values.

The trenches formed in the surface of the electrode plate can cause breakage of the electrode plate during formation of an electrode group by winding the electrode plate. To prevent this, a method for preventing breakage of an electrode plate while enhancing impregnating ability is disclosed in Patent Document 2.

Figure 8:
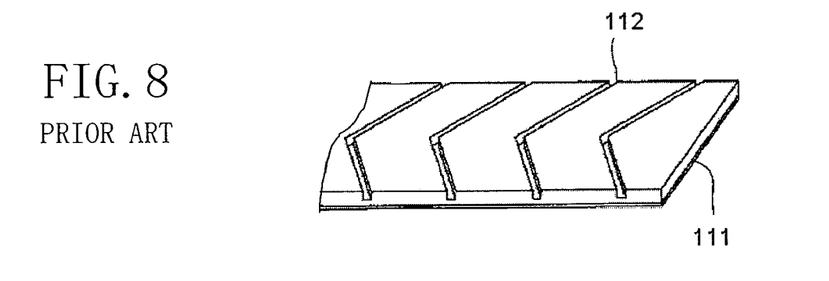
FIG. 8 is a view illustrating a structure of an electrode plate according to another conventional example.

FIG. 8 is a view illustrating a structure of an electrode plate disclosed in Patent Document 2. In FIG. 8, a plurality of trenches 112 are formed in the surface of an electrode plate 111 to be inclined from the longitudinal direction of the electrode plate 111. In the formation of an electrode group by winding the electrode plate 111, tension is applied in the longitudinal direction of the electrode plate, which is different from the direction along which the trenches 112 are formed. Accordingly, tension on the trenches 112 is dispersed, thus preventing breakage of the electrode plate 111.

Patent Document 3 discloses a method for forming a plurality of trenches in the inner surface of a wound electrode plate for the purpose of not enhancing impregnating ability for an electrolyte but preventing deformation of the electrode plate during formation of an electrode group by winding the electrode plate.

Figure 9:
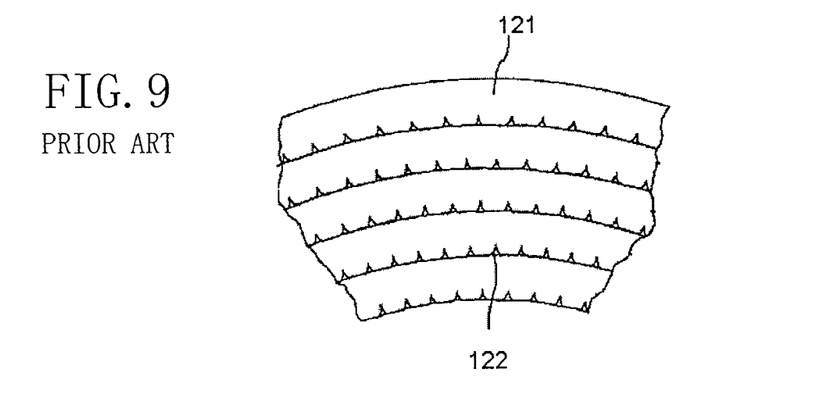
FIG. 9 is a view illustrating a structure of a conventional electrode group.

FIG. 9 is a view illustrating a structure of an electrode group disclosed in Patent Document 3. In FIG. 9, a plurality of trenches 122 are formed in the inner surface of a wound electrode plate 121. This structure reduces pressure on the inner surface of the electrode plate 121 during winding of the electrode plate 121, thus preventing deformation of the electrode plate 121.

Patent Document 1: Japanese Domestic re-publication of PCT international application No. 98/048466.
Patent Document 2: Japanese Laid-Open Patent Publication No. 11-154508
Patent Document 3: Japanese Laid-Open Patent Publication No. 8-153515

DISCLOSURE OF INVENTION

Problems that the Invention is to Solve

A method of increasing the density of an active material by applying a mixture layer containing the active material onto the surface of a current collector, drying the mixture layer, and then compressing the mixture layer with a press or the like in order to further increase the capacity of a secondary battery is known. However, increase in density of an active material involves a decrease in porosity to degrade impregnating ability for an electrolyte, resulting in nonuniform distribution of the electrolyte in an electrode group.

Therefore, formation of trenches in the surface of the mixture layer seems to be also advantageous in uniformalizing distribution of the electrolyte in the electrode group. However, inventors of the present invention found the following problems from various studies on trench formation in high density active material layers (i.e., mixture layers).

Specifically, formation of trenches in the surface of the mixture layer enhances impregnating ability for the electrolyte. However, when trenches are formed only in one face of the electrode plate, the electrolyte locally exists so that "electrolyte depletion" occurs in a region containing a small amount of the electrolyte (i.e., in the face provided with no trenches), resulting in decrease in cycle life.

On the other hand, as a method for forming trenches in both faces of an electrode plate, employed is a method of placing rollers each of whose surfaces has a plurality of projections respectively on the upper and lower faces of an electrode plate and of rotating and moving the rollers with the rollers pressed against the both faces of the electrode plate (hereinafter, this process will be referred to as "roller pressing"). This method allows a plurality of trenches to be formed on both faces of the electrode plate at a time and therefore offers high mass productivity.

It is important to uniformly control the depth of trenches during formation of the trenches. However, in the trench formation by roller pressing, as long as the height of projections provided on the roller surface is equal to the depth of trenches to be formed, the trenches is controlled to have the identical depth by pressing an electrode plate at a given pressure even with different densities in an active material layer. In addition, in the roller pressing, trenches are formed by tucking in the surface of the mixture layer with the projections of the roller. Consequently, portions of the electrode plate except for the trenches swell in an amount corresponding to the tucked surface, resulting in increase in thickness of the electrode plate after the trench formation. However, since a portion of a roller provided with no projections (hereinafter, referred to as a "roller body") presses the surface of the electrode plate except for the trench portion to exert a rolling action, so that the increase in thickness of the electrode plate after trench formation is suppressed.

The above-mentioned method, however, has the following drawbacks in performing trench formation on a large number of electrode plates in mass production processes. That is, as described above, the roller body presses the surface of the electrode plate except for trenches at a given pressure in the trench formation, so that an active material adheres to the roller body. Accordingly, the height of projections of the roller substantially varies, thus failing to uniformly control the depth of trenches. In addition, the active material adhering to the roller body itself is pressed at a high contact pressure, and thus is not easily taken off with a solvent or the like, leading to difficulty in maintenance.

In view of stability in trench formation in mass production and maintainability, trench formation is preferably performed without pressing of the roller body against the electrode plate, i.e., with only projections of the roller pressed against the electrode plate.

However, when only projections of the roller are pressed against both faces of the electrode plate at a time in the directions vertical to the electrode plate to form trenches in the both faces of the electrode plate, the electrode plate is bent in some cases. A cycle test on a battery using this electrode plate shows that expansion and contraction of the electrode plate causes the active material layer to be peeled off from a core material (a current collector) so that the cycle life decreases. This problem is more conspicuous than in a case where trenches are formed in both faces with the roller body pressed against the electrode plate.

This peeling of the active material is considered to be because of the following reasons. That is, to prevent bending of the electrode plate in which trenches are formed or to avoid breakage during winding, trenches are advantageously formed to be inclined from the longitudinal direction of the electrode plate. When such inclined trenches are formed in both faces of the electrode plate, the phase of trenches (i.e., the location of trenches) differs between the upper and lower faces of the electrode plate. Accordingly, in forming the trenches, pressures is applied in opposite directions vertical to the surfaces of the electrode plate with the displaced projections of the roller used as supports. It is thought that the electrode plate is bent consequently. This bending of the electrode plate is considered to reduce adhesion between the core material and the active material layer so that expansion and contraction of the electrode plate causes the active material layer to be peeled off from the core material in the cycle test. In the case of forming trenches in both faces with the roller body pressed against the electrode plate, the vertical pressure on the electrode plate is lessened by the roller body so that bending of the electrode plate is less likely to occur.

Figure 10:
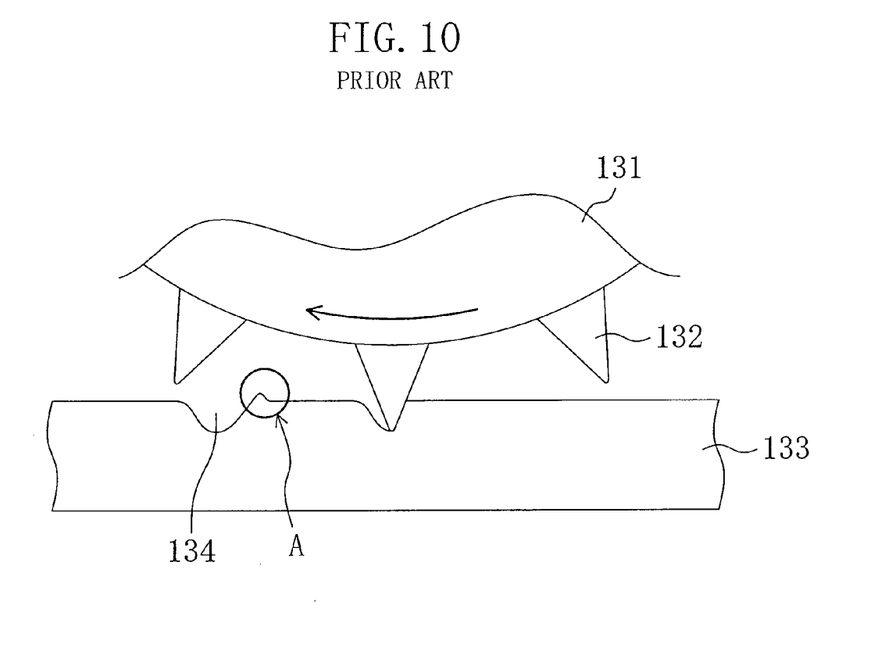
FIG. 10 is a cross-sectional view illustrating the shape of trenches formed by a conventional method.

As illustrated in FIG. 10, in forming trenches 134 by pressing only projections 132 of a roller 131 against an electrode plate 133, an active material layer swells at side edges (i.e., portion A in the drawing) of the trenches 134 in the traveling direction of the roller 131. This is because trenches 134 are formed by tucking in the surface of the active material layer with the projections 132 of the roller 131 in roller pressing so that the side edges of the trenches 134 swell in an amount corresponding to the tucked surface of the active material layer. In particular, a high density active material layer is solid and thus swells more considerably. This swell is more conspicuous as the tips of the projections 132 of the roller 131 become sharper. In the case of forming trenches with the roller body pressed against the electrode plate, this roller body pushes the rising portion so that the swell of the surface is suppressed.

Since such a swell is local, the strength of the active material layer in the rising portion decreases, so that the active material might be peeled off. The peeling of the active material causes not only a decrease in battery capacity but also various internal short circuits. For example, the peeled active material can come in contact with another electrode plate or penetrate the separator to cause an internal short circuit. With peeling of the active material of the negative electrode, when lithium is precipitated in a portion corresponding to the peeled active material and grows to form dendrites, an internal short circuit is likely to occur and, in addition, a decrease in cycle life due to a loss of reaction of the active material and a decrease in battery capacity due to self discharge of precipitated lithium might arise.

It is therefore a main object of the present invention to provide a high capacity secondary battery exhibiting superior impregnating ability for an electrolyte, excellent cycle characteristics, and high reliability and a method for fabricating such a battery.

Means of Solving the Problems

A secondary battery according to the present invention is a secondary battery including an electrode group formed by winding or stacking a positive electrode plate and a negative electrode plate with a separator interposed therebetween, each of the positive and negative electrode plates including a current collector and a mixture layer containing an active material and formed on a surface of the current collector. This secondary battery is characterized in that a plurality of trenches are formed in a surface of the mixture layer of at least one of the positive electrode plate and the negative electrode plate, and that the trenches have curvature portions at side edges and bottom centers thereof.

This structure can prevent the strength of the active material layer from locally decreasing at side edges of the trenches. Consequently, it is possible to effectively suppress occurrence of an internal short circuit due to peeling of the active material and a decrease in cycle life. In addition, since curvature portions are also provided at bottom centers of the trenches, cracks of the active material layer at the bottoms of the trenches can be suppressed so that occurrence of an internal short circuit due to peeling of the active material and a decrease in cycle life can be suppressed.

Preferably, the trenches are continuously formed in the surface of the mixture layer formed at each of both faces of the electrode plate at a given pitch along a longitudinal direction of the electrode plate, and the pitch is 200 μm or less.

With this structure, bending of the electrode plate during formation of trenches in the both faces of the electrode plate can be suppressed, thus effectively suppressing a decrease in cycle life resulting from peeling of the active material layer from a core material (i.e., a current collector).

A method for manufacturing a secondary battery according to the present invention includes the steps of: (a) preparing a positive electrode plate and a negative electrode plate each including a current collector and a mixture layer containing an active material and formed on a surface of the current collector; (b) placing, on at least one of the electrode plates, a roller whose surface is provided with a plurality of projections, and rotating and moving the roller with the roller pressed against a surface of the electrode plate, thereby forming a plurality of trenches in a surface of the mixture layer; (c) winding the positive electrode plate and the negative electrode plate with a separator interposed therebetween, thereby forming an electrode group; and (d) housing the electrode group in a battery case together with an electrolyte. In step (b), the projections on the surface of the roller have curvature portions at tips of the projections, and only the projections are pressed against the surface of the electrode plate so that the trenches are formed in the surface of the mixture layer.

With this method, trenches are formed by rotating the roller with only the projections having curvature portions at their tips pressed against the surface of the mixture layer, so that curvature portions are allowed to be formed at side edges and bottom centers of the trenches. This can prevent the strength of the active material layer from locally decreasing at the side edges of the trenches. Consequently, it is possible to effectively suppress occurrence of an internal short circuit due to peeling of the active material and a decrease in cycle life.

Preferably, in step (b), the roller is placed on each of the upper and lower faces of the electrode plate and is rotated and moved with the roller pressed against each of both faces of the electrode plate so that the trenches are formed in the surface of the mixture layer at each of the both faces of the electrode plate at a time. Further, the trenches are preferably continuously formed at a pitch of 200 µm or less along a longitudinal direction of the electrode plate in the surface of the mixture layer at each of the both faces of the electrode plate.

With this method, bending of the electrode plate in forming trenches in the both faces of the electrode plate can be suppressed, thus effectively suppressing a decrease in cycle life resulting from peeling of the active material layer from a core material (i.e., a current collector).

Effects of the Invention

According to the present invention, curvature portions are provided at side edges and bottom centers of trenches formed in the surface of an electrode plate so that peeling of an active material can be prevented. In this manner, it is possible to suppress occurrence of an internal short circuit and a decrease in cycle life. In addition, the pitch of trenches formed in both faces of the electrode plate is adjusted to 200 µm or less, so that bending of the electrode plate can be suppressed, thus allowing suppression of a decrease in cycle life caused by peeling of the active material layer from a core material (i.e., a current collector). Accordingly, a high capacity secondary battery exhibiting superior impregnating ability for an electrolyte, excellent cycle characteristics, and high reliability can be implemented.

BRIEF DESCRIPTION OF DRAWINGS

FIGS. 3(a) and (b) are views illustrating the shape of trenches in the embodiment.

DESCRIPTION OF NUMERALS

| | |
|---|---|
| 1 | positive electrode plate |
| 2 | negative electrode plate |
| 3 | separator |
| 4 | battery case |
| 5 | electrode group |
| 6 | sealing plate |
| 7 | gasket |
| 8, 9 | mixture layer |
| 10 | current collector (core material) |
| 15 | upper roller |
| 16 | lower roller |
| 17 | projection |
| 30, 31 | trench |
| 30a | bottom center |
| 30b | side edge (apexes on both sides) |

BEST MODE FOR CARRYING OUT THE INVENTION

Hereinafter, an embodiment of the present invention will be described with reference to the drawings. In the drawings, components having substantially the same function are denoted by the same reference numeral. The present invention is not limited to the following embodiment.

Figure 1:
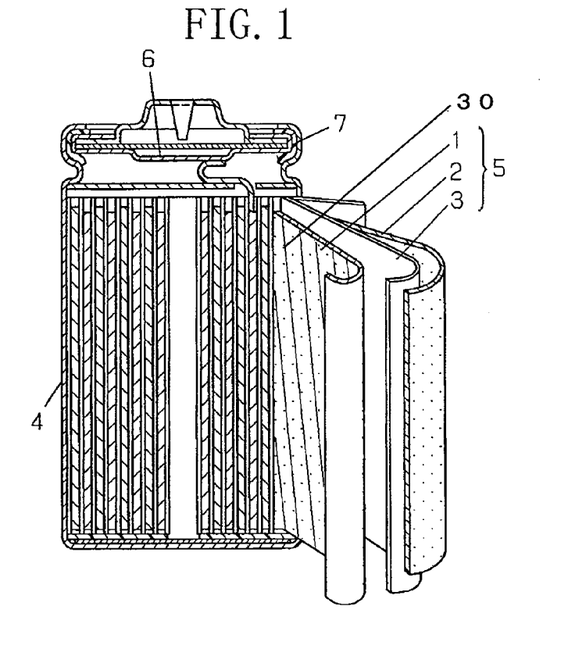
FIG. 1 is a cross-sectional view schematically illustrating a structure of a lithium ion secondary battery according to an embodiment of the present invention.

FIG. 1 is a cross-sectional view schematically illustrating a structure of a lithium ion secondary battery according to an embodiment of the present invention. A positive electrode plate 1 and a negative electrode plate 2 each including a current collector and a mixture layer containing an active material and formed on the surface of the current collector are wound in a spiral with a separator 3 interposed therebetween, thereby forming an electrode group 5. The electrode group 5 is housed in a cylindrical battery case 4 with a bottom together with a nonaqueous electrolyte (not shown). The opening portion of the battery case 4 is sealed by crimping with a sealing plate 6 and a gasket 7 attached to the rim of the sealing plate 6. The active material is a material capable of inserting and extracting lithium ions.

As illustrated in FIG. 1, a plurality of trenches 30 are formed in the surface of the mixture layers of the positive electrode plate 1 and the negative electrode plate 2. The electrolyte poured in the battery case 4 permeates the entire electrode group 5 by way of these trenches 30, thus reducing the time for impregnation.

Figure 2:
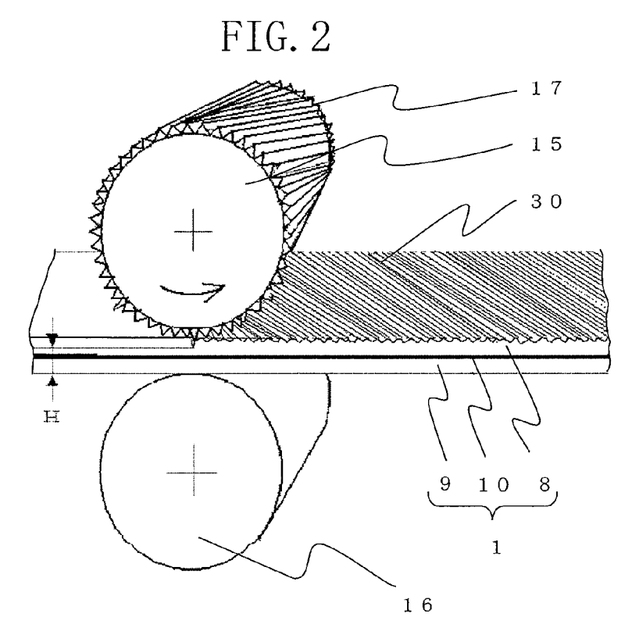
FIG. 2 is a perspective view schematically showing a method for forming trenches according to the embodiment of the present invention.

FIG. 2 is a perspective view schematically showing a method for forming trenches according to the embodiment of the present invention. The present invention is applicable irrespective of the positive and negative polarity, and thus the positive and negative electrode plates will be hereinafter simply referred to as "electrode plates" without specifying the polarity, and only reference numerals used for members for the positive electrode are shown in the drawings. The present invention, of course, includes an example directed only to one polarity.

First, an electrode plate 1 in which mixture layers 8 and 9 containing active materials are formed on both faces of a current collector 10 is prepared, and an upper roller 15 and a lower roller 16 each having a surface provided with a plurality of projections 17 are placed on the upper and lower faces of the electrode plate 1, respectively (projections on the lower roller 16 are not shown). Then, the rollers 15 and 16 are rotated and moved while being pressed against the both faces of the electrode plate 1, thereby forming a plurality of trenches 30 in the surfaces of the mixture layers 8 and 9 at a time.

Figure 3A:
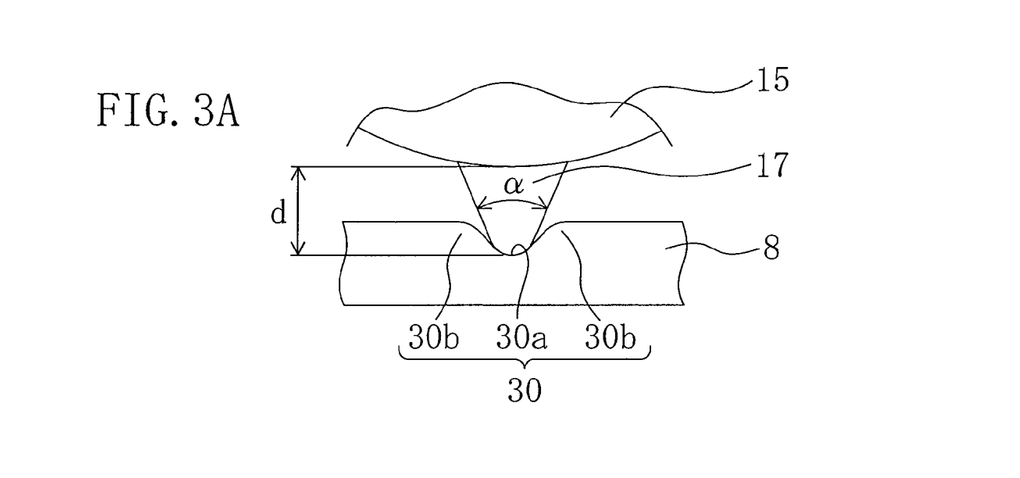
FIG. 3(a) is a cross-sectional view showing a state in which trenches are formed by pressing projections of a roller against a mixture layer.
Figure 3B:
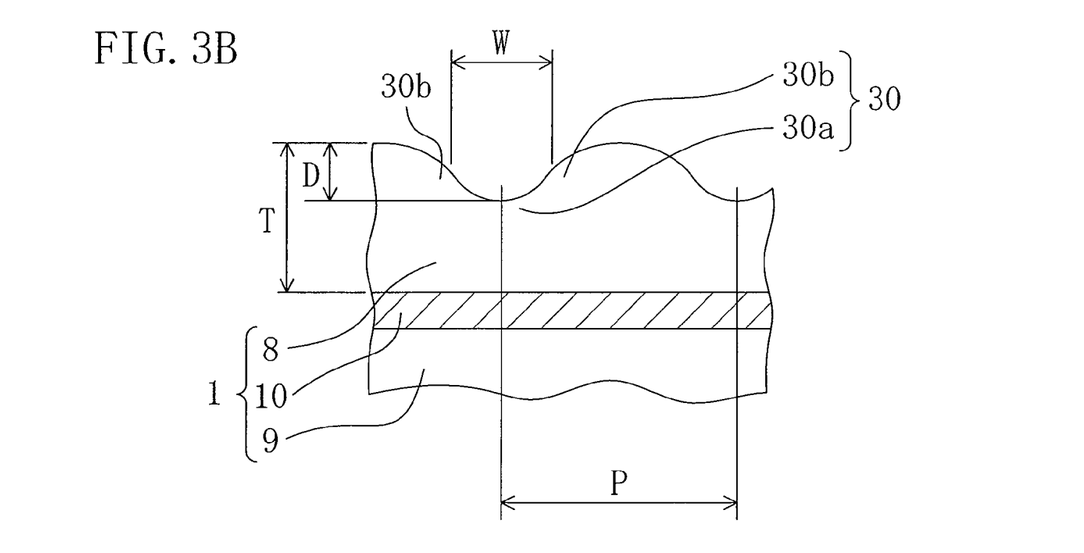
FIG. 3(b) is a cross-sectional view schematically showing the shape of the trenches.

FIGS. 3(a) and (b) are cross-sectional views illustrating the shape of the trenches 30 formed in the manner described above. FIG. 3(a) shows a state in which the trenches 30 are formed by pressing the projections 17 of the roller 15 against the mixture layer 8. FIG. 3(b) schematically shows the shape of the trenches 30.

As illustrated in FIG. 3(a), the trenches 30 are formed in a state in which the body of the roller 15 is not pressed against the mixture layer 8, i.e., only the projections 17 of the upper roller 15 are pressed against the mixture layer 8. In this state, the mixture layer 8 does not adhere to the body of the roller 15, so that the depth of the trenches 30 is controlled to be uniform.

In addition, the tips of the projections 17 are formed as curvature portions, so that the curvature portions are allowed to be formed in the bottom centers 30a and side edges 30b (i.e., apexes on both sides) of the trenches 30. Specifically, by pressing the mixture layer 8 with the projections 17 rotated, the trenches 30 are formed with the surface of the mixture layer 8 tucked in accompanied with drawing of the side edges 30b of the trenches 30. Accordingly, the bottom centers 30a and the side edges 30b of the trenches 30 have smooth curvature portions.

This can prevent the mixture layer 8 from being locally weaken at the bottom centers 30a and the side edges 30b of the trenches 30, thus effectively suppressing occurrence of an internal short circuit due to peeling of the active material and a decrease in cycle life.

If the side edges 30b of the trenches 30 had no curvature portions, the electrolyte held in the trenches 30 would lose its destination and overflow the electrode group toward the outside through expansion and contraction of the active material during charge and discharge, resulting in "electrolyte depletion" of the electrolyte. This nonuniform distribution of the electrolyte can cause a decrease in cycle life. On the other hand, when the side edges 30b of the trenches 30 have curvature portions, the curvature portions assure a space for holding the electrolyte even after expansion and contraction of the active material, thus suppressing "electrolyte depletion" of the electrolyte.

In forming the trenches 30 by pressing only the projections 17 of the roller 15 against the mixture layer 8, the mixture layer 8 swells at the side edges 30b of the trenches 30. Since the trenches 30 are formed by tucking in the surface of the mixture layer 8 with the projections 17 of the roller 15, the swell mentioned above inevitably occurs in an amount corresponding to tucking of the mixture layer 8. However, the curvature portions at the tips of the projections 17 can suppress the swell at the side edges of the trenches 30.

The "curvature portion" herein refers to a curved portion having a curvature greater than the depth of the trenches 30. The curvature thereof does not need to be constant. For example, when the depth of the trenches 30 is 10 μm, the curvature of the curvature portion is 10 μm or more, and typically 20 μm or more.

As illustrated in FIG. 3(b), the trenches 30 are continuously formed in the surface of the electrode plate 1 at a given pitch P (hereinafter, referred to as a "trench pitch") along the longitudinal direction of the electrode plate 1. The relationship between this trench pitch and bending of the core material (i.e., the current collector) is now described.

As explained above, when trenches are formed in both faces of the electrode plate by pressing only projections of the rollers against the both faces of the electrode plate at a time in the directions vertical to the electrode plate, the electrode plate (i.e., the core material) might be bent. This is because the phase of the trenches differs between the upper and lower faces of the electrode plate so that pressure is applied to the upper and lower faces of the electrode plate in opposite directions vertical to the electrode plate with the displaced projections of the rollers used as supports. Accordingly, the trench pitch is considered an important parameter relating to bending of the core material.

Figure 4:
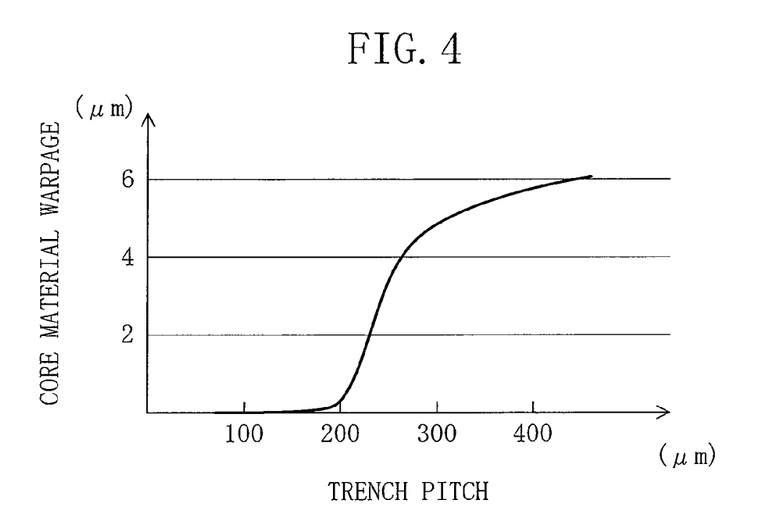
FIG. 4 is a graph showing a relationship between the trench pitch and bending of a core material in the embodiment.

FIG. 4 is a graph showing a result of examination for a relationship between the trench pitch and bending of the core material. In the examination, aluminum with a thickness of 15 μm was used for the core material (i.e., the current collector), the thickness of the mixture layer was 70 μm, and the depth of the trench was 8 μm.

As shown in FIG. 4, core material bending occurs around a trench pitch of 200 μm or more. Accordingly, the trench pitch is preferably 200 μm or less.

The minimum trench pitch is not specifically limited. However, when the trench pitch is small, the proportion of the mixture layer is relatively small to cause a decrease in battery capacity. In addition, when the trench pitch is small, the swells at the side edges interfere with each other between adjacent trenches, so that the thickness of the electrode plate increases. In this case, the outside diameter of the wound electrode group increases, so that the electrode group might fail to be inserted in the battery case. In view of this, the trench pitch is preferably in the range from 50 μm to 200 μm.

Figure 5:
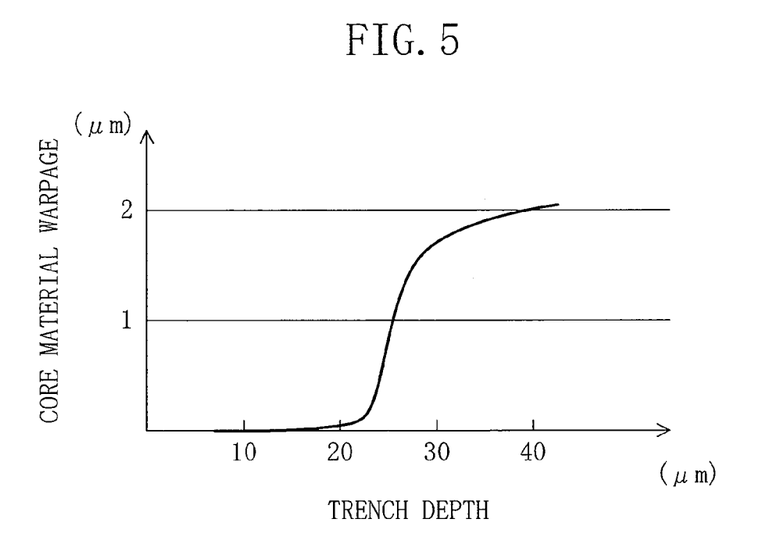
FIG. 5 is a graph showing a relationship between the trench depth and core material bending in the embodiment.

FIG. 5 is a graph showing a result of examination for a relationship between the trench depth and core material bending. The trench pitch in this examination was 170 μm. As shown in FIG. 5, core material bending occurs at a trench depth of about 20 μm (about 30% of the thickness of the mixture layer) or more. Accordingly, the trench depth is preferably 20 μm or less.

The minimum trench depth is not specifically limited. However, since the trench depth is a parameter relating to an impregnation time of the electrolyte and an increase in thickness of the electrode plate after trench formation (where it is an issue whether the electrode group with an increased thickness of the electrode plate can be inserted in a battery case or not), the trench depth is more preferably in the range from 4

μm to 10 μm (i.e., in the range from 5% to 15% of the thickness of the mixture layer).

Referring now to FIGS. 6(a) through 6(d), examples of a trench pattern formed in the surface of the electrode plate are described.

Figure 6A:
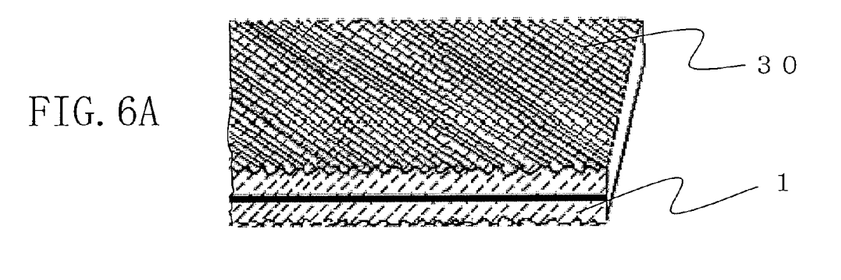
FIGS. 6(a) through (d) are perspective views illustrating respective examples of a trench pattern formed in the surface of an electrode plate in the embodiment.

In the trench pattern illustrated in FIG. 6(a), the trenches 30 are formed to be inclined from the longitudinal direction of the electrode plate 1 and the trenches 30 formed in both faces of the electrode plate 1 have symmetric phases such that the trenches 30 in one face and the trenches 30 in the other are alternately arranged. Accordingly, stress applied on the electrode plate 1 during formation of the trenches 30 is suppressed, thus suppressing peeling of the active material from the mixture layer as well as nonuniform distribution of the electrolyte in the electrode group.

To obtain the foregoing advantages, the inclination angle of the trenches 30 is preferably in the range from 30° to 60°.

Figure 6B:
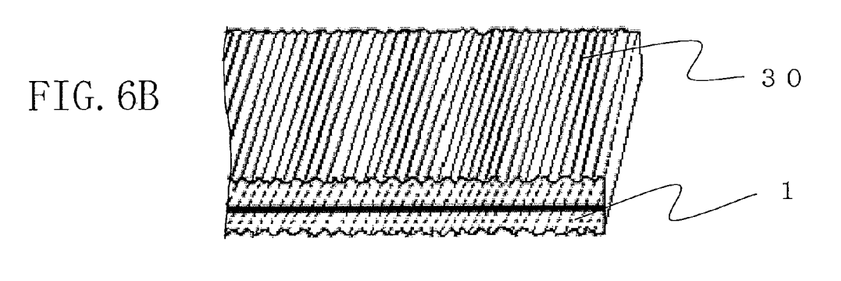

In the trench pattern illustrated in FIG. 6(b), the trenches 30 are perpendicular to the longitudinal direction of the electrode plate 1 and the trenches 30 formed in both faces of the electrode plate 1 have the same phase. Accordingly, stress applied to the electrode plate in the vertical direction is released, thus suppressing bending of the electrode plate.

Figure 6C:
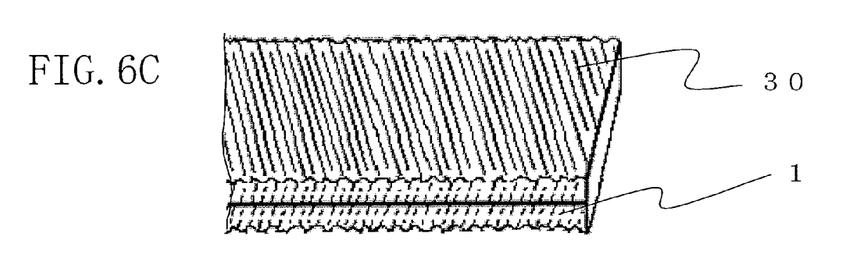

In the trench pattern illustrated in FIG. 6(c), the trenches 30 are formed to be inclined from the longitudinal direction of the electrode plate 1 and each extends from an end to an intermediate point with respect to the transverse direction of the electrode plate 1. Accordingly, the electrolyte is allowed to be held in an intermediate portion of the electrode group, thus suppressing nonuniform distribution of the electrolyte in the electrode group.

Figure 6D:
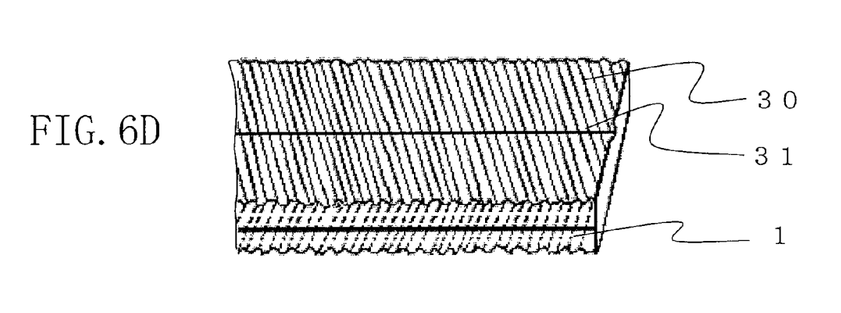

In the trench pattern illustrated in FIG. 6(d), in addition to the trenches 30 formed to be inclined from the longitudinal direction of the electrode plate 1, at least one trench 31 extending in the longitudinal direction of the electrode plate 1 is formed to communicate with the trenches 30. Accordingly, nonuniform distribution of the electrolyte in the electrode group is suppressed and gas generated during overdischarge is easily released from the electrode group. The trench 31 may be inclined from the longitudinal direction of the electrode plate 1.

Preferable shape and other features of the trenches 30 of the present invention are as follows:

As described above, to prevent the core material from being bent, the pitch of the trenches 30 (i.e., the trench pitch) needs to be 200 μm or less, and the depth of the trenches 30 needs to be 20 μm or less (more preferably in the range from 4 μm to 10 μm). In view of this, to enhance impregnating ability, a large number of trenches 30 are preferably formed such that the total volume of the trenches 30 is in the range from 0.5% to 10% of the whole volume of the mixture layer 8.

In the wound electrode group, the trenches 30 are preferably formed in the inner surface of the electrode plate 1. Then, stress in winding of the electrode plate 1 is suppressed, thus preventing cutting of the electrode plate and other failures. In addition, when the trenches 30 are formed in the inner surface of the electrode plate 1, the ability of pouring the electrolyte is enhanced as compared to the case of forming the trenches 30 in the outer surface of the electrode plate 1 as long as the trench depth is identical. This is because the trenches 30 formed in the outer surface of the electrode plate 1 are drawn during winding of the electrode plate 1 so that the substantial depth of the trenches 30 decreases. In a case where the trenches 30 are formed in the inner surface of the electrode plate 1, the pitch of the trenches 30 formed in the inner surface of the electrode plate 1 is more preferably wider in a portion near the outside of the wound electrode group than in a portion near the center of the wound electrode group. Accordingly, the impregnating ability for the electrolyte at the center of the tightly-pressed electrode group is enhanced, so that uniform distribution of the electrolyte in the electrode group can be achieved. The same advantages are also obtained when trenches are formed in both faces of the electrode plate 1.

Now, examples of typical materials for components of the lithium ion secondary battery of this embodiment are described.

Examples of the positive electrode active material include lithium cobaltate, denatured lithium cobaltate (e.g., a substance in which aluminium or magnesium is dissolved in lithium cobaltate), lithium nickelate, denatured lithium nickelate (e.g., a substance in which nickel partially substitutes for cobalt), lithium manganate, and denatured lithium manganate.

As a conductive agent for the positive electrode, carbon black such as acetylene black, Ketjen black, channel black, furnace black, lamp black, thermal black, and various types of graphite may be used solely or a two or more of these materials may be used in combination, for example.

Examples of a binder for the positive electrode include polyvinylidene fluoride (PVdF), denatured polyvinylidene fluoride, polytetrafluoroethylene (PTFE), and rubber particle binder containing acrylate units. Acrylate monomer to which a reactive functional group is introduced or acrylate oligomer may be mixed in the binder.

The above-mentioned positive electrode active material, conductive agent, and binder are mixed and dispersed in a dispersing agent and the resultant mixture is kneaded with the viscosity thereof optimized for application to a current collector, thereby obtaining a positive electrode material mixture paste. Thereafter, the positive electrode material mixture paste is applied onto the current collector made of aluminium foil and is dried, and then a positive electrode mixture layer containing an active material which has been pressed to have high density is formed.

Examples of the negative electrode active material include various types of natural graphite, artificial graphite, silicon-based composite materials such as silicide, and various types of alloy composition materials.

Examples of a binder for the negative electrode include PVDF, denatured PVDF, and various types of binders. To enhance lithium ion acceptability, styrene-butadiene rubber particles (SBR), denatured SBR, and cellulose-based resin such as carboxymethyl cellulose (CMC) may be also used or a small amount of such materials may be added.

Examples of the nonaqueous electrolyte include various types of lithium compounds such as $LiPF_6$ and $LIBF_4$ as electrolyte salt. As a solvent, ethylene carbonate (EC), dimethyl carbonate (DMC), diethyl carbonate (DEC), and methyl ethyl carbonate (MEC) may be used solely or two or more of these materials may be used in combination, for example. To form a good film on the positive or negative electrode plate or to ensure stability during overdischarge, vinylene carbonate (VC), cyclohexylbenzene (CHB), or denatured VC or CHB may be used.

A material for the separator is not specifically limited as long as the material has a composition that can be used in the operation range of a lithium ion secondary battery. For the separator, a microporous film of olefin resin such as polyethylene and polypropylene may be used solely or two or more of these films may be used in combination, for example. The thickness of the separator is not specifically limited, but is preferably in the range from 10 μm to 25 μm.

Example

Hereinafter, evaluation results on cycle characteristics and impregnating ability, for example, of the lithium ion secondary battery of the present invention will be described based on examples. The present invention is not limited to the following examples.

Example 1

First, 100 parts by weight of lithium cobaltate as an active material, 2 parts by weight of acetylene black as a conductive agent with respect to 100 parts by weight of the active material, and 2 parts by weight of polyvinylidene fluoride as a binder with respect to 100 parts by weight of the active material were stirred and kneaded with an appropriate amount of n-methyl-2-pyrrolidone, thereby producing a positive electrode material mixture paste. This positive electrode material mixture paste was applied onto a current collector made of aluminium foil with a thickness of 15 μm, was dried, and then was pressed to have a total thickness of 170 μm.

Next, as illustrated in FIG. 3(a), an upper roller 15 on which projections 17 having a tip angle α of 115° and a height d of 25 μm were formed at an angle of 45° with respect to the central axis of the upper roller 15 and a lower roller 16 provided with no projections were prepared. Then, as illustrated in FIG. 2, a positive electrode plate 1 after being pressed was passed through a gap between the upper roller 15 and the lower roller 16, thereby forming trenches 30 in the surface of the positive electrode plate 1.

In forming the trenches 30, the pressure applied from the upper roller 15 with the projections 17 and the lower roller 16 on the positive electrode plate 1 was adjusted to have a trench depth of 8 μm such that a total volume of the trenches 30 was 0.5% of the whole volume of a mixture layer 8.

Thereafter, the positive electrode plate 1 was subjected to a slitter process to have a width defined in the cylindrical lithium secondary battery ICR18650 so that the mixture layer 8 of the positive electrode plate 1 had thickness T of 70 μm, the trenches 30 had a depth D of 8 μm, a trench pitch P of 170 μm, and a width W of 50 μm, as illustrated in FIG. 3(b).

On the other hand, 100 parts by weight of artificial graphite as an active material of a negative electrode plate, 2.5 parts by weight (1 part by weight in terms of the solid content of a binder) of a styrene-butadiene rubber particle dispersing element (solid content: 40 parts by weight) as a binder with respect to 100 parts by weight of the active material, and 1 part by weight of carboxymethyl cellulose as a thickener with respect to 100 parts by weight of the active material were stirred with an appropriate amount of water, thereby producing a negative electrode material mixture paste. This negative electrode material mixture paste was applied onto a current collector made of copper foil with a thickness of 8 μm, was dried, and then was pressed to have a total thickness of 170 μm. Then, a slitter process is performed to a width defined in the cylindrical lithium secondary battery ICR18650, thereby producing a negative electrode plate.

Subsequently, the positive electrode plate and the negative electrode plate were wound with a separator of a polyethylene microporous film with a thickness of 16 μm interposed therebetween such that the trenches 30 were located at the inner side of the positive electrode plate 1.

Example 2

An electrode group was produced in the same manner as in Example 1 except that a lower roller 16 was equivalent to the upper roller 15 used in Example 1 so that trenches 30 were formed in both faces of a positive electrode plate 1. As illustrated in FIG. 6(a), the trenches 30 formed on the both faces of the positive electrode plate 1 are positioned at an angle of 45° with respect to the longitudinal direction of the positive electrode plate 1 and the phases of the trenches in the respective both faces of the positive electrode plate 1 are symmetric.

Comparative Example 1

An electrode group was produced in the same manner as in Example 1 except that trenches 30 were formed in none of the faces of a positive electrode plate 1.

Comparative Example 2

An electrode group was produced in the same manner as in Example 1 except that trenches 30 having a depth of 40 μm and no curvature portions at their side edges (i.e., apexes on both sides) were formed in both faces of a positive electrode plate 1.

(Characteristic Evaluation)

Prior to production of an electrode group by winding electrode plates, trenches were first visually inspected for 20 positive electrode plates produced in Examples and Comparative Examples to check for peeling of the active materials.

Next, the electrode group produced in each of Examples and Comparative Examples was housed in a battery case, and then 5.50 g of a nonaqueous electrolyte in which 1 M of $LiPF_6$ and 3 parts by weight of VC were dissolved in an EC, DMC, and MEC mixture solvent was poured in five separate steps, was held for a minute with a reduced pressure of −60 mgHG in a sealed container, and then was opened to the atmosphere. In this state, an impregnation time of the nonaqueous electrolyte in the electrode group was measured by averaging the results on 20 positive electrode plates.

Then, the battery completed by sealing the opening portion of the battery case housing the electrode group by crimping was subjected to preconditioning charge and discharge twice, and stored for seven days in an atmosphere of 45° C. Thereafter, the following charge and discharge cycle was repeated 200 times. Specifically, the battery was charged at a constant voltage of 4.2 V and 1400 mA. When the charge current decreased to 100 mA, the charge was finished and the battery was discharged to a cut-off voltage of discharge of 3 V at a constant current of 2000 mA. This operation was taken as one cycle and 200 such cycles were performed. The discharge capacity ratio at the 200th cycle with respect to the first cycle is defined as the cycle life.

Table 1 shows results of the characteristic evaluation described above.

TABLE 1

| | Active material peeling | Impregnation time of nonaqueous electrolyte | Cycle life |
|---|---|---|---|
| Example 1 | none | 20 min. | 85% |
| Example 2 | none | 10 min. | 100% |
| Comparative Example 1 | none | 60 min. | 83% |
| Comparative Example 2 | observed | 10 min. | 80% |

As shown in Table 1, in Examples 1 and 2 and Comparative Example 2 in which the trenches 30 were formed in the positive electrode plate 1, the impregnation time of the nonaqueous electrolyte was shortened to a fifth to tenth of that in Comparative Example 1 in which no trenches 30 were formed.

By increasing the depth of the trenches 30 to have a large proportion of the total volume of the trenches 30 with respect to the whole volume of the mixture layer 8, a gap is formed between the positive electrode plate and the separator in the further highly-pressed electrode group, so that the impregnation time of the nonaqueous electrolyte is shortened. However, as in Comparative Example 2, when the depth of the trenches 30 increased, the positive electrode plate 1 was bent, so that peeling of the active material due to a decrease in adhesion between the current collector 10 and the mixture layer 8 was observed. It is also considered that peeling of the active material was also due to a decrease in strength of the mixture layer 8 because the trenches 30 of Comparative Example 2 have no curvature portions at their side edges (i.e., apexes on both sides).

In Examples 1 and 2, the cycle life is increased. In particular, in Example 2 in which trenches were formed in both faces of the electrode plates, the cycle life is longer than that in Example 1 in which trenches were formed in one face. This seems to be because the electrolyte quickly permeated the entire electrode group and, even when the active material was expanded during discharge, nonuniform distribution of the electrolyte was less likely to occur in the case of forming trenches in both faces so that no "electrolyte depletion" occurred.

From the foregoing results, formation of the trenches 30 in the electrode plate according to the present invention can implement a high capacity secondary battery exhibiting superior impregnating ability for the electrolyte, excellent cycle characteristics, and high reliability.

Then, impregnating ability for the electrolyte and a change in thickness of the electrode plate with a change in depth of the trenches 30 were evaluated for Examples 3 through 8 and Comparative Example 3. In this evaluation, trenches 30 were formed in the same manner as in Example 2, and pressures on the positive electrode plate 1 was adjusted to form trenches 30 having depths from 2μ to 12 μm for Examples 3 through 8, respectively.

Table 2 shows the results of the above evaluation where Example 6 is identical to Example 2 and Comparative Example 3 is identical to Comparative Example 1.

TABLE 2

|  | Impregnation time of electrolyte | Thickness increase in electrode plate | Capability of case insertion | Trench depth |
| --- | --- | --- | --- | --- |
| Example 3 | 60 min. | 0 | Yes | 2 μm |
| Example 4 | 40 min. | 3 μm | Yes | 4 μm |
| Example 5 | 20 min. | 4 μm | Yes | 6 μm |
| Example 6 | 10 min. | 5 μm | Yes | 8 μm |
| Example 7 | 8 min. | 7 μm | Yes | 10 μm |
| Example 8 |  | 10 μm | No | 12 μm |
| Comparative Example 3 | 60 min. | 0 | Yes | 0 |

As shown in Table 2, the effect of reducing the impregnation time of the electrolyte appears at the trench depth of 4 μm (Example 4) or more. As the depth of the trenches 30 increases, the time for impregnation of the electrolyte in the electrode group is more greatly reduced. On the other hand, when the trenches 30 are formed, the active material at the trenches 30 is compressed and the compressed active material partially moves between the trenches 30, so that the thickness of the electrode plate increases. Consequently, the electrode plate increases the outside diameter of the wound electrode group, and the electrode group cannot be inserted in the battery case at a trench depth of 12 μm (Example 8) or more. Accordingly, in the positive electrode plate conforming to the ICR18650 standard, the depth of the trenches 30 is preferably in the range from 4 μm to 10 μm.

Then, accuracy of the depth of the trenches 30 controlled by adjusting the height of the projections 17 of the roller was evaluated.

Specifically as illustrated in FIG. 3(a), not only the projections 17 of the roller 15 but also the roller body thereof was pressed against the mixture layer 8, thereby forming trenches 30 having a depth D equal to the height d of the projections 17.

Trenches 30 having the same trench pattern as that in Example 2 were formed in both faces of the positive electrode plate 1 by using an upper roller and a lower roller whose projections 17 had heights d of 8 μm and 12 μm, respectively. This trench formation was repeatedly performed on 10,000 positive electrode plates 1.

The result shows that the variation in depth of the trenches 30 is 15% or more. This seems to be because the roller body pressed the electrode plate surface except for the trenches 30 in the trench formation so that the active material adhered to the roller body to substantially change the height of the projections 17 of the rollers and, as a result, the depth of the trenches 30 failed to be uniformly controlled.

The foregoing description is given on the preferred embodiment of the present invention, but is not intended to limit the present invention. Of course, various modifications can be made. For example, trenches are formed in the positive electrode plate in the above embodiment, but may be, of course, formed in the negative electrode plate. The wound electrode group does not need to be cylindrical and may be flat and also be constituted by a stack of electrode plates. The type of a secondary battery to which the present invention is applied is not specifically limited, and the present invention is also applicable to a nickel-metal hydride storage battery and the like as well as a lithium ion secondary battery.

INDUSTRIAL APPLICABILITY

A secondary battery according to the present invention exhibits superior impregnating ability for an electrolyte, excellent cycle characteristics, and high reliability and is useful as a high capacity secondary battery for a portable power supply.

The invention claimed is:

1. A method for manufacturing a secondary battery, comprising the steps of:
(a) preparing a positive electrode plate and a negative electrode plate each including a current collector and a mixture layer containing an active material and formed on a surface of the current collector;
(b) placing, on each of upper and lower faces of the electrode plates, a roller whose surface is provided with a plurality of projections, and rotating and moving the rollers with the rollers pressed against each of both faces of the electrode plate, thereby forming a plurality of trenches in a surface of the mixture layer at each of the both faces of the electrode plate at a time;
(c) winding the positive electrode plate and the negative electrode plate with a separator interposed therebetween, thereby forming an electrode group; and
(d) housing the electrode group in a battery case together with an electrolyte; wherein in step (b), the projections on the surface of the rollers have curvature portions at tips of the projections, only the projections are pressed against the surface of the electrode plate so that the trenches are formed in the surface of the mixture layer, and the trenches are continuously formed at a pitch of 200 μm or less along a longitudinal direction of the electrode plate in the surface of the mixture layer at each of the both faces of the electrode plate.

2. The method for manufacturing the secondary battery of claim 1, wherein in the step (b), the phase of the trenches formed in one of the both faces of the electrode plate shifts from that of the trenches formed in the other face of the electrode plate.

3. The method for manufacturing the secondary battery of claim 1, wherein in the step (b), the trenches have a depth of 20 μm or less.

4. The method for manufacturing the secondary battery of claim 3, wherein the depth of the trenches is in the range from 4 μm to 10 μm.

5. The method for manufacturing the secondary battery of claim 1, wherein in the step (b), the trenches are inclined from a longitudinal direction of the electrode plate.

6. The method for manufacturing the secondary battery of claim 5, wherein the phases of the trenches formed in the respective both faces of the electrode plate are symmetric.

7. The method for manufacturing the secondary battery of claim 5, wherein in the step (b), each of the trenches extends from an end to an intermediate point with respect to a transverse direction of the electrode plate.

8. The method for manufacturing the secondary battery of claim 5, wherein in the step (b), the trenches are inclined from the longitudinal direction of the electrode plate, and at least one additional trench extending in the longitudinal direction of the electrode plate is formed to communicate with the trenches.

9. The method for manufacturing the secondary battery of claim 5, wherein in the step (b), the inclination angle is in the range from 30° to 60°.

10. The method for manufacturing the secondary battery of claim 1, wherein in the step (b), the trenches have a total volume in the range from 0.5% to 10% of a whole volume of the mixture layer.

11. The method for manufacturing the secondary battery of claim 1, wherein in the step (b), the trenches are formed in an inner surface of the electrode plate in a wound electrode group.

12. The method for manufacturing the secondary battery of claim 11, wherein in the step (b), the pitch of the trenches formed in the inner surface of the electrode plate is wider in a portion near an outside of the wound electrode group than in a portion near a center of the wound electrode group.

* * * * *